(No Model.)
E. LEAK.
MAKING PORCELAIN AND CHINA PASTE BOXES.
No. 256,008. Patented Apr. 4, 1882.
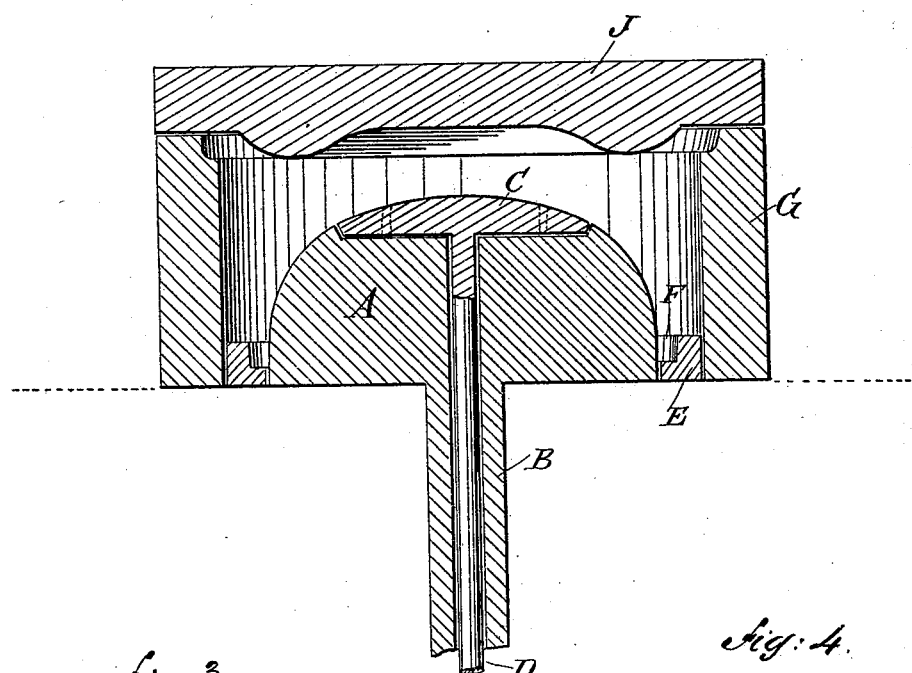
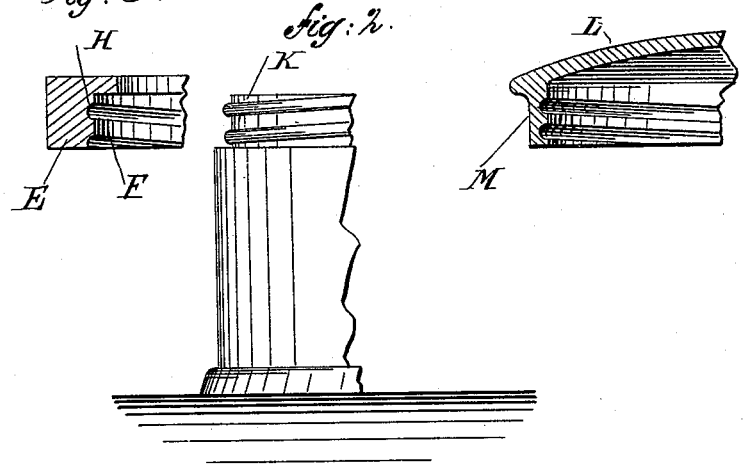
WITNESSES:
Chas. Nida
C. Sedgwick
INVENTOR:
E. Leak
BY Munn &Co
ATTORNEYS.

UNITED STATES PATENT OFFICE.

ELIAS LEAK, OF TRENTON, NEW JERSEY.

MAKING PORCELAIN AND CHINA PASTE-BOXES.

SPECIFICATION forming part of Letters Patent No. 256,008, dated April 4, 1882.

Application filed October 15, 1881. (No model.)

*To all whom it may concern:*

Be it known that I, ELIAS LEAK, of Trenton, in the county of Mercer and State of New Jersey, have invented certain new and useful Improvements in Making Porcelain and China Paste-Boxes, of which the following is a full, clear, and exact description.

The object of my invention is to facilitate removing the molding-dies and mandrel from a clay mold of a porcelain or china paste-box without breaking or damaging any parts of this clay mold.

The invention consists in a mandrel for molding porcelain and china paste-boxes, which mandrel is provided with a removable plate in its rounded or molding surface, this plate being provided with a handle-rod extending through the tubular handle of the mandrel, whereby the molded box can be removed from the mandrel by pressing this plate upward.

The invention further consists in a loose grooved or annularly recessed ring surrounding the mandrel and filling the space between the mandrel and the outer die, as will be more fully described hereinafter.

Reference is to be had to the accompanying drawings, forming part of this specification, in which similar letters of reference indicate corresponding parts in all the figures.

Figure 1 is a cross-sectional elevation of my improved paste-box mold and mandrel. Fig. 2 is an elevation of a part of a paste-box provided with a threaded neck. Fig. 3 is a cross-sectional elevation of the mandrel-ring for forming the threaded neck. Fig. 4 is a cross-sectional elevation of a paste-box cover with an internally-threaded flange.

The mandrel A has a rounded upper or molding surface of the same size and shape as the desired cavity or recess of the paste-box that is to be made, and this mandrel is provided with a tubular handle, B, projecting downward from its bottom surface. The middle part of the rounded or molding surface of the mandrel is formed by a removable plate or valve, C, fitting in a recess in the rounded surface of the mandrel, the rounded surface of this plate C and the rounded surface of the mandrel proper being flush. A handle-rod, D, projects downward from the lower surface of the plate C through the tubular handle B of the mandrel. A ring, E, provided with a groove or annular recess, F, in its upper and inner edge, fits closely around the lower edge of the mandrel, and is not made integral with the mandrel, but detachable from the same. The thickness or width of this ring E is such that it completely fills the annular space between the lower edge of the mandrel A and the lower edge of the outer die, G. If desired, the vertical side of the groove F may be provided with recessed or raised screw-threads H, as shown in Fig. 3, air-holes to be made where necessary in the various parts.

The operation is as follows: The ring E is placed around the mandrel A and the outer die, G, is placed around the ring E. The mandrel A, the ring E, and the die G are placed on a suitable support, and the cylindrical die G is filled with clay, porcelain mass, &c., which is pressed into it by the top die, J, which is pressed down on the outer die, G, and forms the bottom of the paste-box. This paste-box is now molded and must be removed from the dies and the mandrel, and it is here where the difficulties have been experienced heretofore, for the neck K, formed by the groove F, is very apt to break off or become damaged while the molded box is being removed from the dies. Heretofore the ring E has been made integral with the mandrel, and that caused the breaking of the neck K. I first remove the top die, J, and then press the mandrel A upward by means of the handle B, causing the molded box, the mandrel, and the ring E to leave the outer die, G. Then the plate or valve C is pressed upward by means of the handle-rod D, whereby the molded box will be removed from the mandrel. Then the ring E is removed from the edge of the molded box, whereby the neck K will be formed perfectly, and cannot be damaged in any way whatever.

If the neck K is to be provided with a screw-thread, the ring E must be provided with threads, as shown in Fig. 3, and must be screwed off of the molded box.

The lid L, with or without a screw-thread in its flange M, is molded with a mandrel constructed in the same manner as the mandrel A, but without the ring E. If the flange M of the lid is not provided with a screw-thread, the molded lid can be removed from its mandrel in the manner described above; but if the flange is provided with a screw-thread, the mandrel provided with a screw-thread must be screwed out of the lid. It is evident that other vessels resembling paste-boxes can be made in the same manner.

Having thus fully described my invention, I claim as new and desire to secure by Letters Patent—

1. The combination, with the mandrel A, having a rounded upper surface and a tubular handle, of a removable plate, C, having a rounded surface flush with that of the mandrel, and provided with a rod, D, projecting from its lower surface through said tubular handle, as shown and described.

2. The combination, with the molding-mandrel A, of the plate C in its rounded or molding surface, and of the handle-rod D, attached to this plate, substantially as herein shown and described, and for the purpose set forth.

3. The combination, with the molding-mandrel A, of the plate C, the handle-rod D, and the tubular handle B, substantially as herein shown and described, and for the purpose set forth.

4. The combination, with the molding-mandrel A, of the loose grooved or annularly-recessed ring E, substantially as herein shown and described, and for the purpose set forth.

5. The combination, with the molding-mandrel A, provided with a removable plate, C, of the outer die, G, and the top die, J, substantially as herein shown and described, and for the purpose set forth.

6. The combination, with the molding-mandrel A, of the outer die, G, the top die, J, and the loose grooved ring E, interposed between the mandrel A and the die G, substantially as herein shown and described, and for the purpose set forth.

ELIAS LEAK.

Witnesses:
LOYD BAILY,
GEORGE W. BYRAM.